United States Patent [19]
Theer

[11] 3,738,245
[45] June 12, 1973

[54] PHOTOGRAPHIC APPARATUS WITH THROUGH-THE-LENS VIEW FINDER

[75] Inventor: Anton Theer, Munich, Germany

[73] Assignee: Agfa-Gevaert Aktiengesellschaft, Leverkusen, Germany

[22] Filed: May 2, 1972

[21] Appl. No.: 249,530

[30] Foreign Application Priority Data
May 7, 1971 Germany.................. P 21 22 709.8

[52] U.S. Cl............................ 95/42, 95/44, 95/11 V
[51] Int. Cl. ............................................ G03b 19/12
[58] Field of Search......................... 95/42, 44, 11 V

[56] References Cited
UNITED STATES PATENTS
3,094,911  6/1963  Reiche................................. 95/45 X
2,969,706  1/1961  Rosier.................................. 95/44 C
3,029,720  4/1962  Leitz................................... 95/44 C Primary Examiner—John M. Horan
Attorney—Michael S. Striker

[57] ABSTRACT

A motion picture camera wherein the lens mount is rotatable in the camera body to thereby move the picture taking lens lengthwise of the optical axis. A through-the-lens view finder defines two image planes and is provided with indications or symbols located in or close to that image plane which is nearer to the eyepiece and representing various distances between the lens and the subject. An index in the other image plane is mounted on a lever which is pivotable in the camera body by a follower which tracks a cam of the lens mount so that the index pinpoints that indication or symbol which represents the selected adjustment of the lens. The lever has a first portion which receives motion from the follower, a second portion which carries the index, and a third portion which connects the first and second portions and is deformable to allow for adjustments of the index relative to the indications independently of the lens mount.

10 Claims, 4 Drawing Figures

PATENTED JUN 12 1973　　3,738,245

PHOTOGRAPHIC APPARATUS WITH THROUGH-THE-LENS VIEW FINDER

BACKGROUND OF THE INVENTION

The present invention relates to photographic apparatus in general, and more particularly to improvements in still cameras or motion picture cameras with through-the-lens view finders.

View finders which receive through-the-lens light are customarily employed in still cameras or motion picture cameras with interchangeable picture taking lenses or with picture taking lenses of variable focal length. In motion picture cameras for use by amateurs, some incoming scene light which has passed through the picture taking lens is reflected into the view finder by resorting to a fixedly mounted beam divider or by utilizing a sector-shaped mirror which is fixedly installed in the plane of the diaphragm. Since the light reflecting element (beam divider or mirror) is fixedly mounted in the path of incoming light, such light must be divided with a view to insure that a large percentage of scene light will reach the foremost unexposed film frame as well as to insure a satisfactory brightness of the image which is seen by looking through the eyepiece of the view finder. If the view finder employs a ground glass plate which is placed into an intermediate image plane in front of the eyepiece and serves to allow for viewing of the subject as well as to facilitate the focusing of the picture taking lens, the view finder image is often too dark due to the light-diffusing effect of the ground glass plate.

It was already proposed to omit the ground glass plate or analogous light diffusing means so that the person looking through the eyepiece sees an aerial image of the subject or scene. Such image is much brighter than the image on a ground glass plate. However, when the distance between the picture taking lens and the subject varies with attendant shifting of the image plane, the observer's eye attempts to conform to such changes and is unable to reliably judge the sharpness of the viewed image. Also, the observation of a hair line in the optimum image plane is too strenuous for an inexperienced camera user. Therefore, such cameras normally dispense with focusing control in the view finder, especially if the picture taking lens is adjustable only within a range which, under normal circumstances, allows for satisfactory depth of field for estimation of distances from the subject or scene. The distance which is estimated by the user of the camera is selected by manually adjusting the picture taking lens with reference to a distance scale, i.e., by moving the lens in the direction of the optical axis. A drawback of such cameras is that the focusing cannot be changed with a requisite degree of accuracy while the camera is in actual use, for example, while taking pictures of a moving subject. The depth of field is particularly unsatisfactory when the intensity of scene light is low and when the camera uses a picture taking lens with a substantial focal length. The user is then compelled to interrupt the making of exposures in order to change the focal length of the lens.

SUMMARY OF THE INVENTION

An object of the invention is to provide a photographic apparatus, particularly a motion picture camera, with a novel and improved through-the-lens view finder which need not employ a ground glass plate or analogous light diffusing means but is still capable of enabling the user to focus the picture taking lens during the making of exposures.

Another object of the invention is to provide a novel and improved view finder wherein the means for indicating various distances from the subject can be adjusted to insure that the indications furnished by such means accurately reflect the actual distance between the picture taking lens and the subject.

A further object of the invention is to provide a still camera or a motion picture camera which embodies the improved view finder.

The invention is embodied in a photographic apparatus which comprises a housing or body, a picture taking lens installed in a mount which is movable relative to the housing to thereby focus the lens onto subjects located at different distances from the lens (the mount is preferably rotatable relative to the housing to thereby move the lens in the direction of the optical axis), and a through-the-lens view finder which is mounted in or on the housing and defines a plurality of real image planes. The view finder includes an eyepiece located behind the image planes, indications observable through the eyepiece in the region of one of the image planes and representing various distances from the subject, index means movably mounted in the region of another image plane and being observable through the eyepice, and motion transmitting means (e.g., a link train) interposed between the mount and the index means to move the index means relative to the indications in response to movement of the mount relative to the housing whereby the indication which is pinpointed by the index means represents the corresponding distance between the subject or scene and the lens.

The motion transmitting means may comprise a cam which is provided on the lens mount, a follower which tracks the cam, and a preferably pivotable carrier which receives motion from the follower and supports the index means. In order to allow for accurate adjustments of the index means relative to the indications independently of the lens mount, the carrier preferably comprises a first portion which receives motion from the follower, a second portion which supports the index means, and a third portion which connects the first and second portions and is deformable to thereby change the position of the index means independently of the lens mount.

The indications are preferably located in or close to an image plane which is disposed between the eyepiece and the index means of the view finder.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
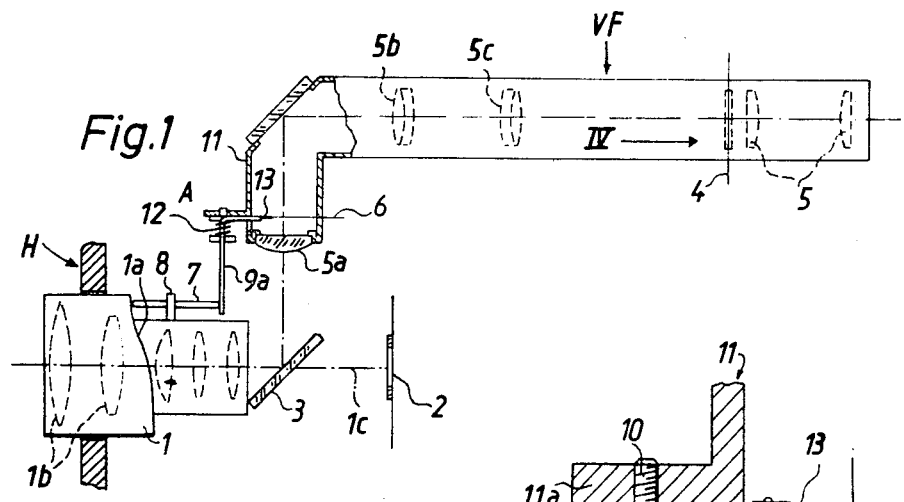
FIG. 1 is a fragmentary schematic partly longitudinal vertical sectional view of a photographic apparatus including a view finder which embodies the invention.

Referring first to FIG. 1, there is shown a portion of a motion picture camera which comprises a housing or body H having a front wall which supports a rotatable mount or barrel 1 for a picture taking lens 1b. The lens 1b focusses a real image of the subject or scene onto the foremost unexposed frame of motion picture film 2. The shutter and the diaphragm are omitted in FIG. 1 for the sake of clarity. A partially reflecting mirror 3 is positioned in the path of incoming scene light behind the lens mount 1 to reflect a certain amount of light into a through-the-lens view finder VF having a casing 11 for an optical system which includes an eyepiece 5 located at the rear end of the casing 11. The remaining elements of the optical system of the view finder VF (such elements include the schematically indicated lenses 5a, 5b, 5c) are known from the art and require no detailed description. It suffices to say that the optical system of the view finder VF defines several real image planes including a rear image plane 4 wherein an enlarged image of the subject or scene can be observed by looking through the eyepiece 5, and a front real image plane 6 which is located between the mirror 3 and the image plane 4.

Figure 2:
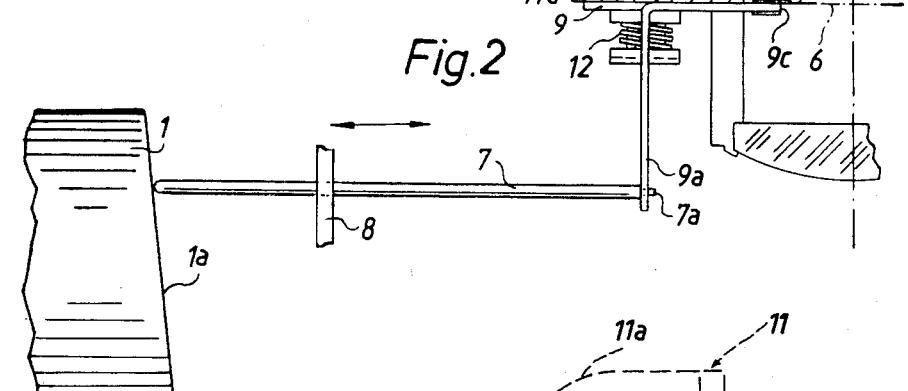
FIG. 2 is an enlarged view of the detail A in the structure shown in FIG. 1.
Figure 3:
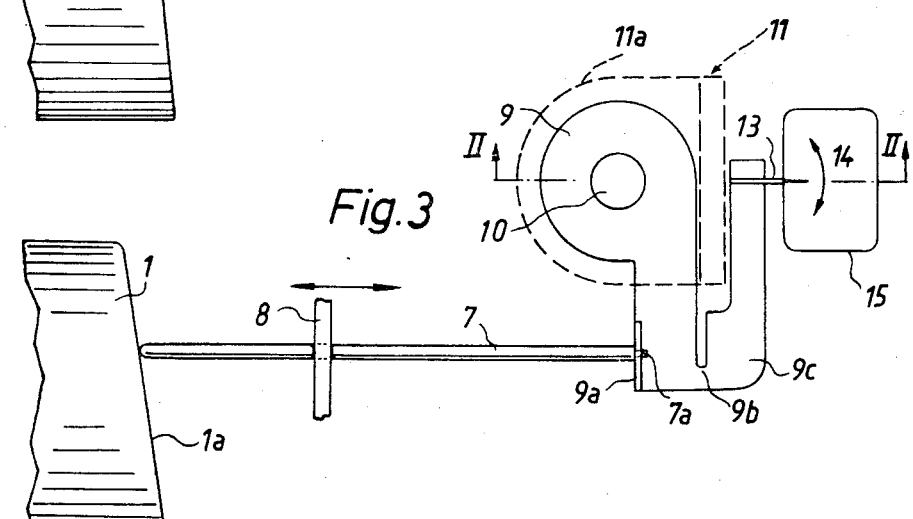
FIG. 3 is a plan view of the structure shown in FIG. 2.

The detail A of the structure shown in FIG. 1 is illustrated on a larger scale in FIGS. 2 and 3. This detail shows the mechanical components of the motion transmitting means between the mount 1 for the picture taking lens 1b and an index 13 which is movable in the front real image plane 6 to thereby pinpoint selected indications or symbols 16 (see FIG. 4) which are located in the rear real image plane 4 in front of the eyepiece 5. The rear portion 1a of the mount 1 constitutes a face cam 1a which is tracked by a rod-like follower 7. The latter is reciprocable in suitable guide means 8 of the housing H and has a smaller-diameter rear end portion or extension 7a received in a hole or slot which is provided in a portion or arm 9a of a carrier 9 here shown as a lever which is mounted on the portion 11a of the casing 11 so as to be turnable about the axis of a pivot member 10. The latter has an externally threaded portion which is received in a tapped bore of the casing portion 11a. A torsion spring 12 surrounds the pivot member 10 and serves as a means for biasing the portion 9a against the follower 7 so as to simultaneously bias the front end portion of the follower against the cam 1a on the rotatable lens mount 1. When the lens mount 1 is rotated by hand or by a motor, the follower 7 moves lengthwise in parallelism with the optical axis 1c (FIG. 1) of the lens 1b. Such rotation of the mount 1 causes the lens 1b to move lengthwise of its axis 1c. If desired, the guide means 8 for the follower 7 can be mounted on the lens mount 1. The hole in the lever portion 9a which receives the extension 7a serves to prevent uncontrolled lateral movements of the extension and eventual jamming of the follower 7 in response to rotation of the lens mount 1.

The carrier 9 further comprises a second portion 9c which supports the index 13 and is connected with the portion 9a by means of a deformable third portion 9b.

Figure 4:
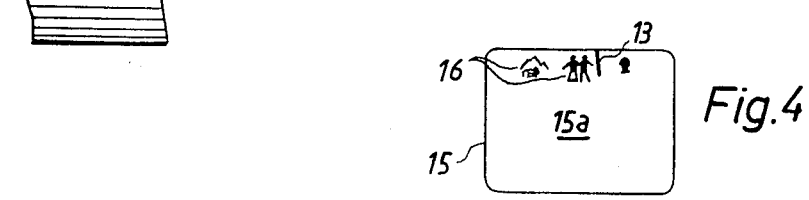
FIG. 4 is a view as seen in the direction of arrow IV in FIG. 1, showing the indications in the rear real image plane of the view finder.

As shown in FIGS. 3 and 4, the index 13 extends into the field of view 15 of the view finder VF so that its tip can be seen by looking through the eyepiece 5. By deforming the portion 9b of the carrier 9, a mechanic can change the position of the index 13 relative to the indications 16 in the rear image plane 4 while the lens mount 1 is at a stand-still. This renders it possible to properly adjust the index 13 in the direction of the optical axis 1c as well as the extent to which the index 13 projects into the field of view 15.

In operation, the user of the photographic apparatus will look through the eyepiece 5 and one of his or her hands will be used to rotate the lens mount 1 to thereby move the picture taking lens 1b lengthwise of the optical axis 1c. The motion transmitting means including the cam 1a, follower 7 and carrier 9 transmits motion to the index 13 which moves relative to the field of view 15 so that its tip moves into register with and thereby pinpoints that indication 16 which is indicative of the momentary adjustment of the lens 1b. The rate at which the carrier 9 moves the index 13 about the axis of the pivot member 10 in response to rotation of the lens mount 1 can be readily determined in advance by proper configuration of the rear face of the cam 1a.

The indications 16 can be provided in or on a flat plate 15a of glass or transparent plastic material which is located in the image plane 4 in front of the eyepiece 5. If desired, the indications 16 can be applied directly to the plane surface of the field lens of the eyepiece 5. FIG. 4 shows that the indications 16 are symbols which indicate to the user whether the setting of the lens 1b is appropriate for the making of close-up exposures, group shots or exposures of remote subjects or scenes. However, it is evident that the indications may represent graduations of a distance scale which are identified by suitable numerals to represent various distances from the subject.

An important advantage of the improved view finder VF is that, even though the user of the camera sees a very bright image of the subject or scene, the user is still in a position to discern the selected setting of the picture taking lens 1b without looking at the position of the mount 1. It is clear that the view finder VF can further enable the user of the camera to observe certain other indications, such as the position of the output element of a light meter, a signal which indicates that the film is in motion, and/or others. The readings which are available to the person looking through the eyepiece 5 are very sharp because the indications 16 are located in or at least in the region of one real image plane, because the index 13 is located in another real image plane, and because the image of the subject can be observed without resorting to a ground glass plate.

It is further within the purview of the invention to place the indications 16 or analogous indications outside of the field of view 15. For example, the mask which defines the field of view 15 can be provided with openings or otherwise designed symbols or indications which can be pinpointed by the index 13. If desired, a ground glass plate can be placed behind or in front of such indications to furnish a diffuse background. The deformable portion 9b of the carrier 9 can be replaced with other suitable means which enables a person in charge of assembling the view finder VF to effect accurate adjustments of the index 13 relative to the indications 16 or analogous indications without turning the lens mount 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising a housing; a picture taking lens; a mount supporting said lens and movable relative to said housing to thereby focus said lens onto subjects located at different distances from said lens; and a through-the-lens view finder arranged to furnish aerial images of subjects, said view finder being mounted in said housing and defining a plurality of real image planes located one behind the other as considered in the direction of entry of light, said view finder including an eyepiece behind said image planes, indications observable through said eyepiece in the region of one of said planes and representing various distances from the subject, index means movably mounted in the region of another of said planes and being observable through said eyepiece, and motion transmitting means interposed between said mount and said index means for moving the latter relative to said indications in response to movement of said mount relative to said housing whereby the indication which is pinpointed by said index means represents the corresponding distance between the subject and said lens.

2. A combination as defined in claim 1, wherein said motion transmitting means includes a link train.

3. A combination as defined in claim 1, wherein said lens is movable lengthwise of its axis in response to movement of said mount and said mount is rotatable relative to said housing.

4. A combination as defined in claim 3, wherein said motion transmitting means comprises cam means provided on said mount, follower means mounted in said housing and arranged to track said cam means, and carrier means movably mounted in said housing and receiving motion from said follower means, said index means being supported by said carrier means.

5. A combination as defined in claim 4, wherein said carrier means comprises a lever which is pivotable by said follower means.

6. A combination as defined in claim 4, further comprising means for biasing said carrier means against said follower means.

7. A combination as defined in claim 4, further comprising means for biasing said follower means against said cam means.

8. In a photographic apparatus, a combination comprising a housing; a picture taking lens; a mount supporting said lens and rotatable relative to said housing to thereby focus the lens onto subjects located at different distances from the lens, said lens being movable lengthwise of its axis in response to rotation of said mount relative to said housing; and a through-the-lens view finder mounted in said housing and defining a plurality of real image planes, said view finder including an eyepiece behind said image planes, indications observable through said eyepiece in the region of one of said planes and representing various distances from the subject, index means movably mounted in the region of another of said planes and being observable through said eyepiece, and motion transmitting means interposed between said mount and said index means for moving the latter relative to said indications in response to movement of said mount relative to said housing whereby the indication which is pinpointed by said index means represents the corresponding distance between the subject and said lens, said motion transmitting means comprising cam means provided on said mount, follower means mounted in said housing and arranged to track said cam means, and carrier means movably mounted in said housing and receiving motion from said follower means, said index means being supported by said carrier means and said carrier means comprising a first portion which receives motion from said follower means and a second portion supporting said index means, said second portion of said carrier means being movable relative to said first portion of said carrier means to thereby adjust the position of said index means relative to said indications independently of said mount.

9. A combination as defined in claim 8, wherein said carrier means further comprises a deformable third portion connecting said first and second portions.

10. A combination as defined in claim 1, wherein said one plane is located between said eyepiece and said other plane.

* * * * *